Nov. 24, 1964　　　J. WILLIAMSON　　　3,158,226
LUBRICANT INJECTORS
Filed Nov. 7, 1961　　　　　　　　　　　　3 Sheets-Sheet 1
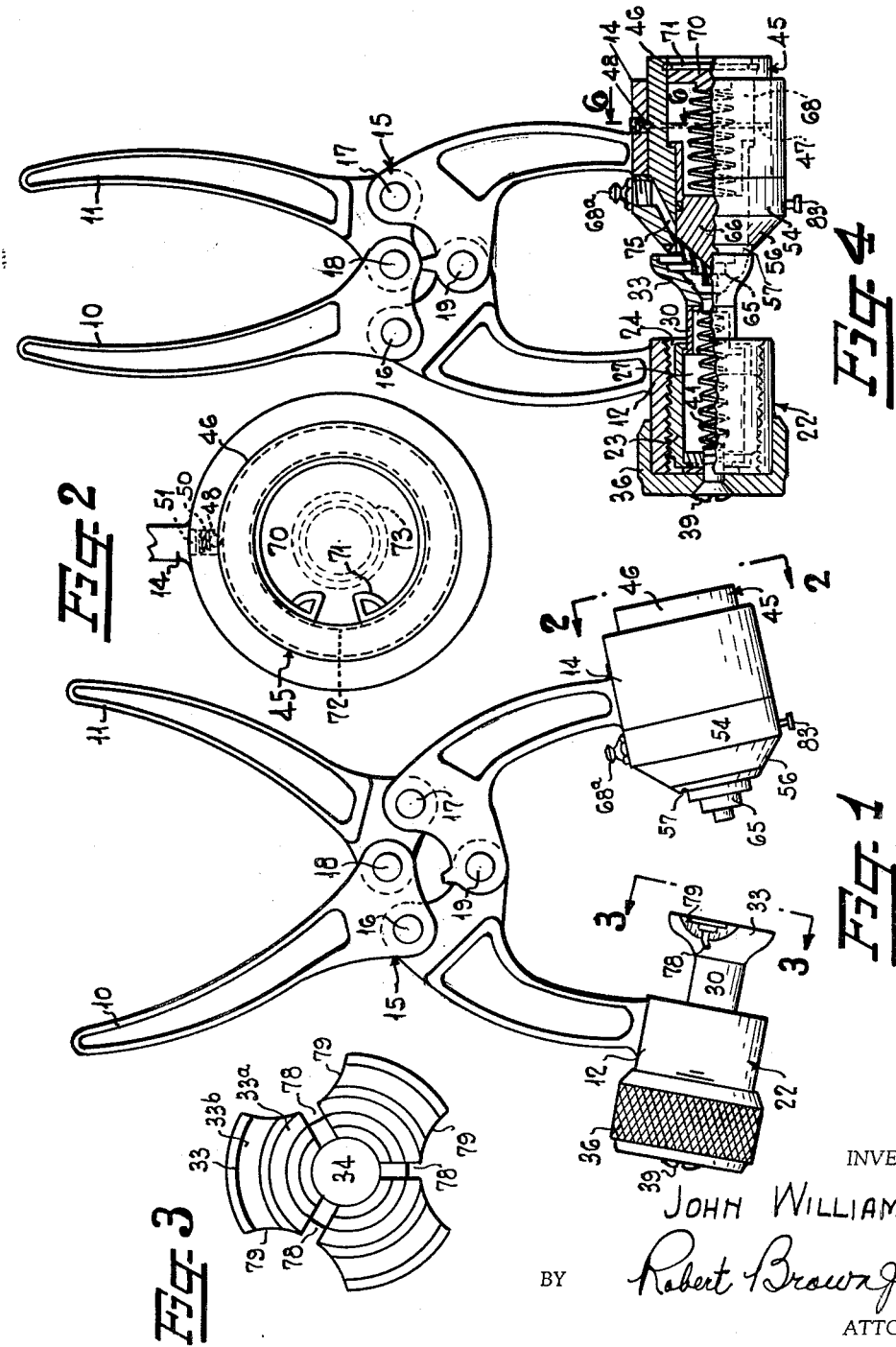
INVENTOR:
JOHN WILLIAMSON
BY Robert Brown Jr
ATTORNEY

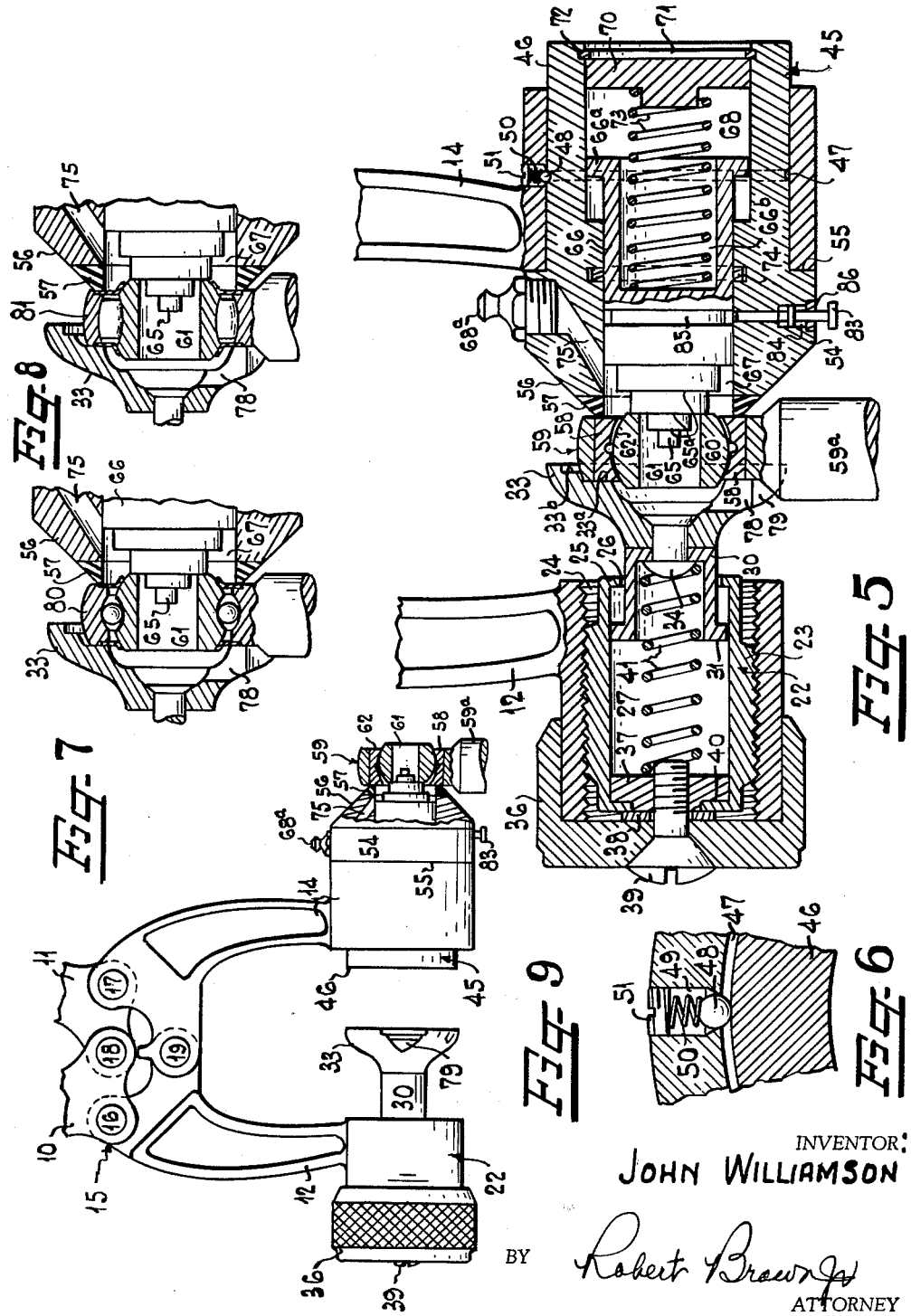

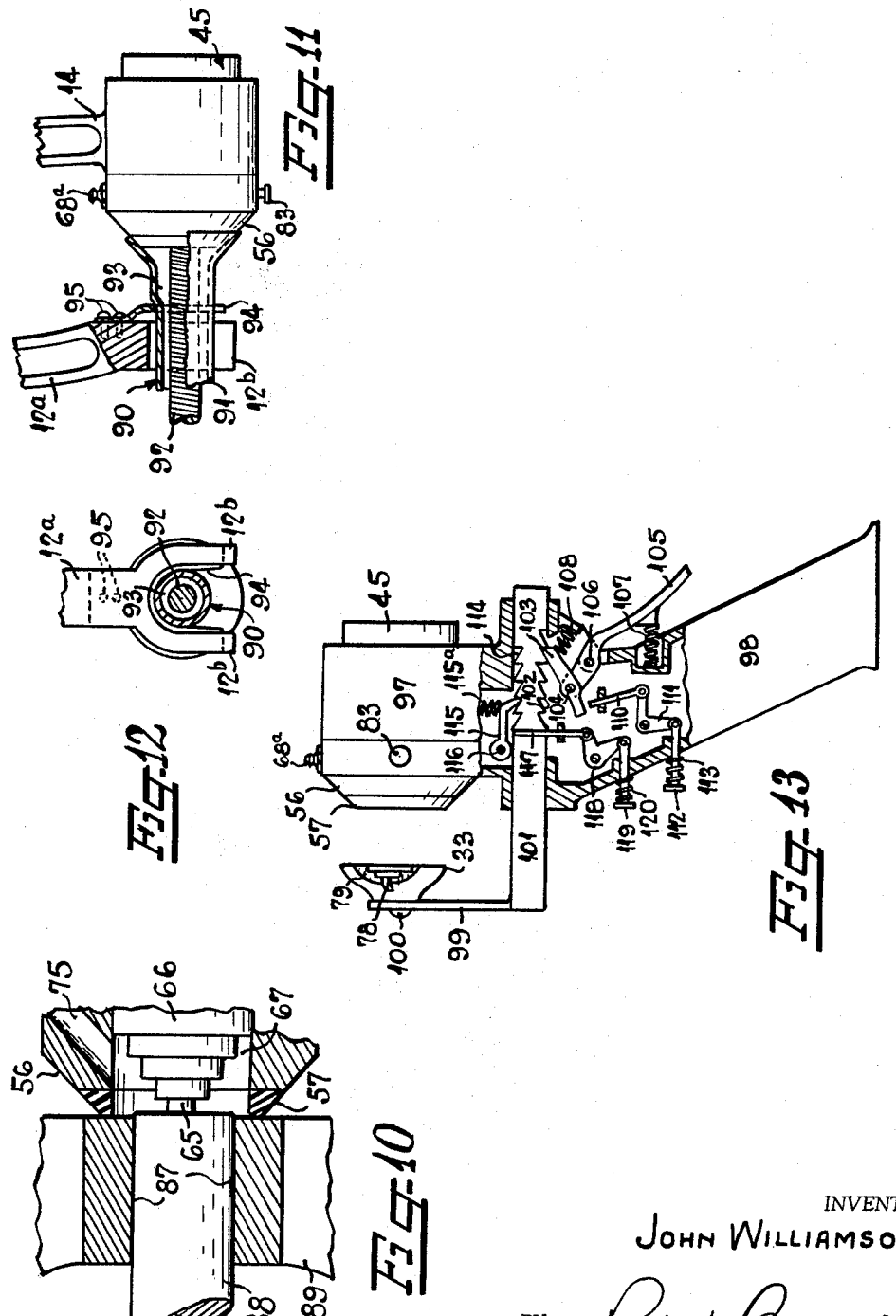

United States Patent Office 3,158,226
Patented Nov. 24, 1964

3,158,226
LUBRICANT INJECTORS
John Williamson, Memphis, Tenn., assignor to Drake Engineering, Inc., Southfield, Mich., a corporation of Delaware
Filed Nov. 7, 1961, Ser. No. 150,744
10 Claims. (Cl. 184—1)

This invention relates to lubrication equipment and more particularly to a device adapted to inject lubricant into the annular open end of the space between two relatively rotatable bearing portions.

In many industries, machines of modern design are required to deliver maximum performance under increased operating speeds and more severe operating conditions. Accordingly, higher unit stresses, and closer bearing clearances are being employed in today's machine design. The aircraft and missile industries have pioneered in the race to secure maximum performance from machines and materials in the current gigantic effort to provide adequate armaments for national safety and defense. As new and higher performance records are attained in these industries, new problems arise which impose greater burdens upon the bearings of the particular mechanism. For example, higher performance in the aircraft industry introduces new sources of complex high frequency vibrations which must be accounted for in the design of the bearings so as to withstand conditions of resonance which are often superimposed upon the normal operating stresses.

The need for increased performance has resulted directly in a need for increased maintenance and more reliable inspection methods. Up to now, manufacturers have been unsuccessful in their search for a bearing or machine that will run without maintenance; the results of these attempts have been unsatisfactory, financially prohibitive or both.

One of the first major contributions aimed at extending the maintenance free operating life of the self-aligning plain bearing was the provision of the dry-lube bearing which embodied a method of impregnating the opposed bearing surfaces with materials such as graphite and molydisulphide, etc. A second contribution comprised the placing of a vibration dampening or absorbing material, such as semi-hard rubber, between the opposed bearing surfaces. Later, nylon and "Teflon" liners were employed at the bearing surfaces to also reduce frictional coefficients. Although the above-mentioned successive contributions effected an overall progressive improvement in the bearing structure, the performance has nevertheless fallen short of the required standards in modern precision-built machines, and still shows a need for proper inspection and maintenance by the machine user. Moreover, the cost of supplying these various types of improved bearings has risen in staggering proportions, the cost increase range from 1200 to 3000 percent. Thus the cost has risen far above the commercial market.

Most of the improved bearings currently used are designed for the purpose, among others, of prolonging the period of operation between lubrications. In the various types of precision-built aircraft construction, it is usually necessary to virtually dismantle the structure in order to secure any degree of lubrication of the bearings. Hence a lubrication operation is a major undertaking which is not only expensive but which renders the machine incapable of use for long periods of time.

Furthermore, for various reasons, the high performance bearing or rod end referred to here cannot be provided with, or adapted to, heretofore known methods of relubrication.

It is therefore an object of this invention to provide a device capable of lubricating bearings—even bearings provided with dirt seals or shields—quickly, effectively, and without damage; and without the necessity of removing bearings from their connecting rod; and, further, without the necessity of dismantling the machine of which the bearing forms a part. Through the use of the present invention, it is possible to employ all relatively rotatable bearing surfaces having the desired minimum clearances therebetween and also to maintain the required lubricant film between the surfaces through frequent and relatively inexpensive re-lubrication operations.

The present invention is so constructed and arranged that lubricant may be injected axially between the inner and outer bearing portions. In other words, the space between the respective bearing surfaces is substantially cylindrical, and the ends of this space are normally open or exposed at opposite faces of the bearing. By introducing lubricant at one end of the cylindrical space, the area of the entry port for the lubricant is much larger than where a fitting is employed for this purpose. Hence, a smaller unit pressure is necessary to inject the lubricant, and a better distribution of the lubricant between the opposed bearing surfaces is obtained.

Furthermore, I have found that most rod end bearings, especially those in the aircraft and missile industries, may each be disconnected one at a time by removing the connecting pin or shaft, and without detaching the bearing at the other end of the rod. Then a lubricant nozzle is tightly connected to one end of the cylindrical space of the disconnected bearing so that lubricant may be injected into said space at all points around the axis of rotation of the bearing, thereby expelling worn lubricant through the opposite end of the space. After lubrication, the bearing is reconnected and the same lubrication procedure is repeated on other bearings.

It is another object of this invention to provide a lubricant injector of the class described, in combination with a manually operable self-locking clamp whereby the opposed faces of a bearing may be clamped between the clamp jaws during a lubrication operation.

It is another object of this invention to provide a lubricant injector having a dispensing nozzle capable of establishing a pressure chamber adjacent to and in communication with one end of the above-mentioned cylindrical bearing space, in combination with a valve mechanism automatically operable upon the establishment of said chamber to admit lubricant into the latter.

It is still another object of this invention to provide a nozzle of the type mentioned above which comprises a bored cylindrical member adapted to yieldably engage the outer bearing portion to form the outer wall of the pressure chamber, and a convergent nose portion yieldably mounted in the cylinder bore and adapted to engage the inner bearing portion to form the inner wall of the chamber.

It is a further object of this invention to provide a nozzle of the type described wherein one end of the cylindrical member and the adjacent convergent end of the nose portion mounted therein combine to present a substantially continuous exterior surface when the nose portion is extended in normal inoperative position, thereby facilitating removal of grease after each lubricating operation.

It is a further object of this invention to provide an improved self-cleaning, self purging lubrication path and nozzle interior pressure chamber.

It is a further object of this invention to provide in combination with a clamping mechanism of the self-locking type, a lubrication head on one of the clamp jaws, and a thrust limiting means carried by at least one of the jaws to prevent the application of excessive pressure which might damage the clamped bearing and the pressure heads.

It is still another object of this invention to provide in an apparatus of the class described, means whereby the lubrication head and cylinder may be quickly detached from its associated clamp jaw or other support, in combination with means on said jaw for supporting the head thereon with its ends in reversed positions. Such a detachable feature also permits the working heads to be interchangeable where different sizes must be used.

It is yet another object of this invention to provide means for obtaining coarse and fine adjustments of the distance between the opposed working heads of the injector so as to accommodate bearings of various sizes.

Some of the objects of the invention having been stated, other objects will appear as the description proceeds when taken in connection with the accompanying drawings, in which:

FIGURE 1 is an elevation of my lubrication injector, showing the relatively movable jaws thereof in extended or separated positions to permit insertion and removal of a bearing to be lubricated;

FIGURE 2 is an elevational view taken along line 2—2 in FIGURE 1;

FIGURE 3 is an elevational view taken along line 3—3 in FIGURE 1;

FIGURE 4 is a view similar to FIGURE 1, showing the relatively movable jaws positioned in a retracted position and also showing portions of the jaws in section;

FIGURE 5 is an enlarged longitudinal sectional view, showing the opposed heads of the respective jaws clampingly engaging a plain self-aligning type of rod end bearing during a lubrication operation;

FIGURE 6 is an enlarged sectional detail view taken along line 6—6 in FIGURE 4, showing the means employed for releasably holding the lubricant dispensing head in position within its associated jaw;

FIGURE 7 is a sectional view similar to the central portion of FIGURE 5, showing an antifriction ball type of self-aligning bearing clampingly engaged by the opposed heads;

FIGURE 8 is a sectional view similar to FIGURE 7, showing an antifriction roller type of self-aligning bearing clampingly engaged by the opposed heads; and FIGURE 9 is a view showing the lubricant dispensing head in reversed position from that shown in the preceding figures;

FIGURE 10 is a sectional detail view similar to FIGURE 9 but showing the position of the lubricant injector head while axially lubricating a shaft journalled in a bearing;

FIGURE 11 is a sectional view similar to FIGURE 5 but showing the position of the injector head while axially lubricating a flexible drive shaft;

FIGURE 12 is a view looking at the left-hand portion of FIGURE 11, and

FIGURE 13 is a view, partially schematic, showing another modified form of the lubricant injector wherein a trigger is employed to effect movement of the clamping jaws toward one another.

Referring more particularly to the drawings, the numerals 10 and 11 designate handles and 12 and 14 the jaw members of a hand operated clamping device that is representative of various pressuring devices employed to operate the lubricant injector. The respective handles and jaws are connected by means of a joint mechanism 15 comprising pivots 16, 17, 18 and 19. Joint mechanism 15 is so constructed and arranged that movement of the handles 10 and 11 with respect to each other will effect relative movement of the jaw members 12 and 14. The above-described parts constitute a self-locking clamp wherein the vertical legs of the jaw members maintain a substantially parallel and concentric relationship in their movement while clamping an interposed bearing.

The lower portion of jaw member 12 has secured therein a pressure plate assembly broadly designated by the reference character 22. A hollow tube 23, which forms a part of the pressure plate assembly, threadably engages a bore 24, said tube having an inturned annular flange 25 integral with one end thereof to thereby provide a restricted opening 26, concentric with a larger opening 27 in tube 23. A hollow plunger 30 is slidably mounted in bores 26 and 27, one end of the plunger being provided with an outwardly extending annular flange 31 which slidably engages the interior of larger bore 27 while the restricted body portion of the plunger slidably engages restricted bore 26.

In the present embodiment, the flange 26 is illustrated as an integral part of tube 23 and therefore will not be crimped to the inturned position shown until the plunger 30 and its flange 31 are inserted into bore 27. It is evident, however, that flange 26 may be secured in the position by numerous other well-known methods, such as by welding, after the members 30, 31 are inserted. Moreover, flange could be formed as a separate nut and threadably secured in the end of bore 27 in a manner identical to that shown and described below in connection with pin 83, bore 84 and threaded nut 86.

The right-hand end of plunger 30 (FIGURES 4 and 5) normally projects outside of tube 23, and this projecting end has a pressure plate 33 secured thereto by any suitable means such as rivet 34.

The pressure plate 33 is adapted to abut during a lubrication operation one side of a bearing such as shown in FIGURES 5, 7, or 8 while elements 57 and 65 abut the opposite side. The inner face of plate 33 is provided with a plurality of substantially concentrically arranged steps 33a and 33b of suitable diameters to accommodate bearings of different sizes. In FIGURE 5, the step 33a is shown in abutting relationship with the outer portion of a plain self-aligning rod end bearing 59.

The marginal circumferential edge of pressure plate 33 is notched at a plurality of spaced points as at 79 to provide clearance for the shank portion 59a of the rod end bearing 59. The spacing of notches 79 is such that one will always be conveniently located with reference to the shank regardless of the angular position of the clamp.

In order to adjust the position of pressure plate assembly 22 relative to jaw member 12, to accommodate various bearing sizes, an adjustment nut 36 is provided, said nut being rigidly secured to one end of tube 23 by means of a plain washer 37, a lock washer 38, and a machine screw 39. It will be noted that the left-hand end of tube 23 (FIGURE 5) has an inturned flange 40, swaged to washer 37, which flange is also clamped between washers 37 and 38 and also attached to nut 36 by means of the machine screw 39.

Compression spring 41 is interposed between plunger 30 and washer 37 to normally urge the plunger and its attached pressure plate 33 to an extended position such as shown in FIGURE 4. Thus the pressure plate is yieldingly mounted relative to jaw member 12. Moreover, a minute or incremental adjustment of the pressure plate is also provided in the spring 41 while additional minute or coarser adjustment may be obtained by turning nut 36 and its attached parts.

The jaw member 14 is positioned opposite the jaw member 12 and has mounted therein an injector head assembly broadly designated by reference character 45, said assembly having a lubricant dispensing or injecting mechanism which will be described in detail in the following specification. A piston housing 46 serves as a housing for the injector head assembly 45 which, in turn, is equipped with a valve-controlled nozzle.

Injector head 45 is releasably secured to jaw member 14 so that it may be removed for inspection, repair or for replacement with an injector head assembly of a different size. Also, the injector head 45 may be reversed in the manner shown in FIGURE 9 for certain lubricating conditions where the clamp action is not feasible. Piston housing 46 therefore is provided with a peripheral groove 47 adapted to be releasably engaged by a ball 48 (FIG- URE 6), which ball is seated in the bottom of bore 49 in member 14. Ball 48 is yieldably pressed into groove 47 by a spring 50, and the spring is confined in the bore by any suitable means such as a threaded nut 51 or by staking. By exerting sufficient pressure upon the smaller end of injector head assembly 45 to cause ball 48 to release itself from groove 47, the assembly 45 may be detached from jaw member 14.

Piston housing 46 has, integral therewith, an enlarged head portion 54 adapted to closely fit against jaw member 14 at the junction or shoulder line 55. The end 56 of head portion 54, disposed opposite pressure plate 33, has a frusto-conical shape and secured to the smaller end of the frusto-conical portion is a second frusto-conical sealing element 57 made of resilient material. The combined outer tapered surfaces of portions 56 and 57 present a single frusto-conical shape.

During a lubricating operation the sealing element 57 is adapted to press against one face of the outer portion 58 of the previously mentioned rod end bearing 59, and at the same time, the step 33a of pressure plate 33 exerts an opposed pressure against the opposite face (FIGURE 5). Portion 58 has a ball 60 rotatably mounted therein, which ball has an opening 61 extending therethrough for accommodating a shaft or pin to which the bearing may be connected. It should be observed that a suitable clearance or space 62 exists between members 58 and 60 for accommodating a film of lubricant. Such clearance 62 may be in increments of one ten-thousandths of an inch in plain self-aligning bearings of the type illustrated in FIGURE 5; however, the thickness of the film will necessarily vary in accordance with the operating conditions of the particular bearing. The opposite ends of space 62 are exposed at opposite faces of the bearing and constitute annular openings into which lubricant may be introduced and/or expelled from the space.

It is necessary to close opening 61 with the convergent nose portion 65 and to simultaneously press the seal 57 against outer bearing portion 58 during a lubricating operation to thereby connect the annular space 62 with an annular lubricant supply nozzle 67 in the manner shown in FIGURE 5. The nose portion 65 is adapted to seal opening 61. Portion 65 is secured upon the end of the piston 66, said piston being slidably mounted in the bore 67 which cooperates with space 62 to form a pressure chamber or nozzle when the lubricating injector is in operation. The other end of piston 66 has a peripheral flange 66a integral therewith which is slidably mounted within a larger bore 68 concentric with bore 67. The nose portion 65 comprises a series of concentric cylindrical segments of progressively decreasing diameters respectively. Each of said segments is adapted to be inserted into an inner bearing opening 61 of a corresponding but slightly larger diameter while the annular end surface 65a of the adjacent larger segment abuts the face of the inner bearing portion. The outer circumferences of the several annular surfaces 65a define a convergent or conical space, which space combines with the frusto-conical surfaces of portions 56 and 57 as a continuation of the latter when the parts assume the position shown in FIGURES 1 and 2.

Bore 68 is normally closed by circular plate 70, the plate being removably confined in the bore by means of a spring lock ring 71. This lock ring fits into a groove 72 on the interior of bore 68 in the manner shown in FIGURES 2 and 5. A coiled spring 73 is interposed between plate 70 and piston 66 and normally urges the latter toward the closed positions shown in FIGURE 4.

During a pressure lubrication of the bearing 59, the O ring 74 prevents the escape of lubricant from the pressure chamber at the left-hand portion of bore 67 between the inner opposed surfaces of members 46 and 66.

When a bearing 59 is lubricated, the lubricant is supplied under pressure to the right-hand exposed end of annular space 62 from the adjacent annular pressure chamber at the left-hand end of bore 67 (FIGURE 5), the lubricant being supplied to bore 67 through a transversely disposed bore 75 in the head portion 54 of piston housing 46. The upper end of bore 75 has a conventional lubricant fitting 68a which is press fitted or threadably secured in the bore, said fitting being adapted for connection to a source of lubricant under pressure.

With a bearing 59 clamped in the position shown in FIGURE 5, the seal 57 encloses the right-hand end of annular bearing space 62, and at the same time, the convergent nose 65 seals off the escape of lubricant from the pressure chamber through bore 61, thereby providing an annular dispensing nozzle which is maintained in open position by the same pressure which seals the joint or connecting surfaces between the bearing and the lubrication injector. By introducing lubricant axially of the bearing, it is possible to obtain a larger entry area and hence use a lesser pressure to lubricate a given bearing than is the case where the conventional fittings are employed to transmit the lubricant through the outer bearing portion. Stated differently, the hollow frusto-conical portions 56 and 57 define the outer wall of the annular nozzle, while the convergent nose 65 serves as the inner wall as well as a closure for the opening 61 and an actuator of piston 66 to uncover lubricant supply port 75.

The fresh supply of lubricant flowing from the pressure chamber into the annular space 62 of the bearing, will expel the worn lubricant from the space and into radial passageways 78 in the pressure plate 33 (FIGURES 3, 7 and 8).

It will be observed that the lower outlet end of lubricant supply port 75 is completely closed by piston 66 when the device is not in operation and in the position shown in FIGURE 4. Therefore, the valve mechanism of the nozzle is shielded from the ingress of contamination immediately upon release of the clamping action on the bearing which has been lubricated. Also, when the parts 56, 57 and 65 are in the position shown in FIGURE 4, a substantially conical outer surface will be presented which can be readily cleansed of undesirable accumulations.

The pressure plate 33 is provided with the previously mentioned thrust limiting spring 41 so that pressure sufficiently great to destroy either the interposed bearing or the resilient seal 57 cannot be applied. In order to perform this function, it is apparent from FIGURES 1, 4 and 5 that spring 41 must be not only stronger than spring 73 in the opposed injector head 45, but also sufficiently strong to absorb the compressive stresses between pressure plate 22, bearing 59 and injector head 45 as a result of manual operation of handles 10 and 11 and joint mechanism 15.

FIGURE 5 illustrates a movable pin 83 which, when pressed manually, moves radially into the inner restricted end of hole 84 drilled in piston housing 46. The inner end of pin 83 is adapted to enter groove 85 in piston 66, thereby holding or latching the piston in a retracted position so as to permit grease to flow continuously into nozzle chamber 67. Pin 83 is retained loosely in piston housing 46 by a suitable retainer 86, the latter being threadably secured or staked in place in the outer enlarged end of the bore. It will be observed that the intermediate portion of pin 83 has an enlargement integral therewith of the same diameter as that of the outer enlarged end of bore 84 in which it is slidably mounted. To insert or remove pin 83 into or from bore 84, the threaded retainer 86 must be manipulated.

FIGURE E7 shows the position of the nozzle 56, 57 and the plate 33 while forming an annular pressure chamber in alignment with the axis of an antifriction ball type rod end bearing 80. Similarly, FIGURE 8 shows an antifriction type of self-aligning roller type of self-aligning bearing 81 in association with the present invention. Although several types of bearings are illustrated, my invention is not limited in use to such types. It should be apparent that the invention may be utilized to force lubricant axially into the space between any two relatively rotatable bearing portions whose ends are sufficiently smooth to permit the exposed end of the space to be enclosed and sealed against escape of lubricant.

FIGURE 9 illustrates another adaptation of the invention where the bearing cannot be clamped during lubrication, but instead, the sealing pressure between the injector and the bearing must be exerted from one side only. Under such operating conditions, the injector head assembly 45 is removed from its position shown in FIGURE 5 and reversed to the position shown in FIGURE 9. In the latter position, the pressure plate 33 cannot be used, but its supporting jaw 12 may be employed along with members 10, 11 and 14 as a handle or support to properly position and press the nozzle against the exposed end of the annular space such as 62.

FIGURE 10 illustrates the use of the invention for axially lubricating the cylindrical bearing surface 87 from the end of a solid shaft 88, said shaft being rotatably mounted in stationary bearing 89. In this use of the invention, the seal 57 engages the face of bearing 89 and surrounds the end of cylindrical bearing surface 87, at which time the end of nose 65 engages the end of solid shaft 88 to retract piston 66 and uncover the end of supply bore 75. Since shaft 88 is solid there is no bore for the conical nose 65 to seal off, such as illustrated in the preceding embodiments.

FIGURES 11 and 12 illustrate the use of the invention for axially lubricating a flexible shaft 90 from its end, said shaft comprising a cover 91 having a flexible driving element 92 therein. As in FIGURE 10, the frusto-conical portion 57 of the injector head 45 is pressed into the end of cover 91. At this time the nose 65 may be forced to a retracted position similar to that shown in FIGURE 10 through engagement with the end of element 92, or if desired, the pin 83 may be depressed to latch the injector head in retracted position. In either case, lubricant will flow axially into space 93 of the flexible drive shaft.

The jaw 12a has a bifurcated lower end forming spaced prongs 12b between which drive shaft 90 is adapted to fit. A bifurcated leaf spring 94 has its upper end secured to jaw 12a as at 95. Spring 94 is shaped similar to the lower end of jaw 12a and is adapted to engage the periphery of drive shaft 90 and resiliently urge it toward injector head 45 into the position shown in FIGURE 11.

FIGURE 13 shows the injector head 45 mounted in a jaw 97 integral with, or fixedly secured upon, the upper end of a handle 98. In this illustration, the piston 66 and nose 65 are held in retracted position by pin 83 and, therefore, are not visible. Pressure plate 33 is positioned opposite frusto-conical portion 56 and detachably secured upon the upper end of a resilient post 99 as at 100, said post having its lower end fixedly secured to a horizontally disposed bar 101 slidably mounted in the upper portion of handle 98.

Bar 101 is provided with ratchet teeth 102 which are adapted to be engaged by dog 103, said dog being pivoted intermediate its ends as at 104 to the upper end of a trigger 105. Trigger 105 is pivotally mounted intermediate its ends as at 106, and is normally urged in a counterclockwise direction about its mounting by spring 107. A spring 108 normally urges dog 103 into engagement with teeth 102. By pressing trigger 105, a step-by-step advancement to the right of the bar 101 and its associated pressure plate 33 can be effected (FIGURE 13).

In order to release dog 103 from teeth 104, a vertically disposed link 110 is provided, the upper end of said link being engageable with one end of the dog. The lower end of link 110 is pivotally secured to one arm of bellcrank 111. The other arm of bellcrank 111 is pivotally secured to pin 112 extending to the exterior of handle 98 and having a spring 113 disposed therearound to normally urge link 110 to the lowered position. By pressing pin 112, however, bellcrank 111 will be rotated to raise link 110 into engagement with one end of dog 103 and to release the latter from teeth 102, thereby permitting bar 101 to be moved to the left in FIGURE 13.

Bar 101 also has teeth 114 in its upper edge which are adapted to be engaged by dog 115 pivoted as at 116. Spring 115a resiliently urges dog 115 into engagement with the teeth to prevent movement of bar 101 to the left while the latter is being advanced to the right through operation of trigger 105.

Dog 115 may be manually released from teeth 114 by means of vertically slidable link 117, the lower end of said link being pivotally secured to one arm of bellcrank 118. The other arm of bellcrank 118 is pivotally secured to one end of a horizontally disposed pin 119. A spring 120 surrounds the projecting end of pin 119 and serves to resiliently hold link 117 in lowered position. When desired to release dog 115, the pin 119 is depressed.

In the drawings and specification there have been set forth a preferred embodiment of the invention, and although specific terms have been employed they are not intended for purposes of limitation, the scope of the invention being defined in the following claims.

I claim:

1. In an apparatus for lubricating a bearing provided with an outer member having an inner member mounted for relative rotation therein, the space between said members being exposed at the exterior surface of the bearing, the combination of a mechanical pressuring device, a pair of relatively movable jaws between which said bearing is adapted to be interposed, joint mechanism interconnecting said pressuring device and said jaws whereby movement of the pressuring device will effect relative movement of the jaws toward and away from said interposed bearing and transmit pressure upon the latter, a lubricant dispensing nozzle mounted on one of said jaws and adapted to register with said space of the interposed bearing, spring-actuated means normally holding said nozzle in closed position and operable in response to said transmitted pressure to open the nozzle and to permit the discharge of lubricant therefrom into said space, and a second spring-actuated means on the other of said jaws for resisting said transmitted pressure including pressures exceeding those required to open said nozzle.

2. In an apparatus for lubricating a bearing provided with an outer member having an inner member mounted for relative rotation therein, said inner member having an opening extending therethrough, the space between said members being substantially concentric with said opening and having the opposite ends thereof exposed at the exterior surface of the bearing, the combination of a mechanical pressure device, a pair of relatively movable jaws between which said bearing is adapted to be interposed, joint mechanism interconnecting said mechanical pressure device and said jaws whereby movement of the pressuring device to each other will effect relative movement of the jaws toward and away from the interposed bearing, a normally closed nozzle mounted on one of said jaws, said nozzle engageable with said interposed bearing and registrable with one end of said space, a source of lubricant under pressure communicating with said normally closed nozzle, means responsive to pressure exerted by said nozzle upon the interposed bearing for opening the nozzle to admit lubricant into said space, a plunger slidably mounted on the other of said jaws and engageable with the opposite face of the interposed bearing, and spring means engaging said plunger for resisting the pressure exerted upon the interposed bearing including pressures exceeding those required to open said nozzle.

3. In an apparatus for lubricating a bearing provided with an outer member having an inner member mounted for relative rotation therein, the space between said members being exposed at the exterior surface of the bearing, the combination of a pair of relatively movable handles adapted to be gripped by the hand of an operator, a pair of relatively movable jaws between which said bearing is adapted to be interposed, joint mechanism interconnecting said jaws and handles whereby gripping of the latter will transmit pressure to said jaws and interposed bearing, a lubricant dispensing nozzle mounted on one of said jaws and adapted to register with said bearing space, spring-actuated means normally holding said nozzle in closed position and operable in response to said transmitted pressure to open the nozzle and to permit the discharge of lubricant therefrom into said space, and a second spring-actuated means on the other of said jaws for resisting said transmitted pressure including pressures exceeding those required to open said nozzle.

4. Lubrication apparatus as defined in claim 2 wherein said nozzle comprises a frusto-conical portion having its smaller end engageable with said bearing, said portion having a bore therein substantially concentric with its outer surface, and a piston mounted in said bore, said piston being provided with a convergent end portion having a base substantially coinciding with the smaller end of the frusto-conical portion when said nozzle is in closed position whereby the outer surface of the convergent end portion forms a continuation of outer surfaces of the frusto-conical portions.

5. In an apparatus for lubricating a bearing provided with an outer member having an inner member mounted for relative rotation therein, the ends of the space between said members being exposed at opposite exterior surfaces of the bearing, the combination of a mechanical pressuring device, a pair of relatively movable jaws between which said bearing is adapted to be interposed, joint mechanism interconnecting said device and said jaws whereby movement of the device will effect relative movement of the jaws toward and away from an interposed bearing and transmit and release pressure to and from the latter respectively, a frusto-conical member mounted upon one of said jaws with its smaller end engageable with the proximate face of an interposed bearing, said smaller end being provided with a bore having a diameter larger than that of the exposed end of said space, a source of lubricant under pressure communicating with said bore, and means including a piston reciprocably mounted in said bore for connecting and disconnecting the flow of lubricant from said source into said space, said piston being provided with a convergent end portion having a base substantially coinciding with the smaller end of said frusto-conical portion when said piston is in disconnecting position whereby the outer surface of the convergent end portion forms a continuation of the outer surface of said frusto-conical portions.

6. Lubrication apparatus as defined in claim 5 wherein said inner bearing member has an opening extending therethrough and adapted to be closed by the convergent end portion of said piston simultaneously with engagement between the frusto-conical and outer bearing members, and wherein the surface of the convergent end portion of the piston is provided with a plurality of concentric parallel cylindrical elements of different diameters adapted to respectively close the inner bearing member openings having corresponding diameters.

7. In a hand-gripped tool for lubricating a bearing having an inner and an outer relatively rotatable portion, said portions having an annular space therebetween concentric with their axis of rotation, the combination of a pair of relatively movable handles adapted to be gripped between the thumb and index finger of an operator's hand, a pair of relatively movable jaws between which said bearing is adapted to be interposed, a nozzle on one of said jaws and registrable with said annular space of an interposed bearing, a source of lubricant under pressure connected to said nozzle, means responsive to the gripping action of the handles by the operator's hand for simultaneously transmitting clamping action to said jaws and the interposed bearing and for actuating said nozzle to admit lubricant from said source into said space, spring means for normally holding said nozzle in closed position and yieldable in response to said transmitted pressure to open the nozzle, and a second spring means on the jaw opposite said nozzle for resisting said transmitted pressure including pressures in excess of the pressures exerted by said first spring.

8. A lubricating tool as defined in claim 7 wherein said gripping action responsive means includes a pawl and a ratchet bar, said bar being slidably mounted upon one of said jaws along a line substantially parallel to the longitudinal axis of said nozzle, and said other jaw being rigidly supported upon said bar for movement in alinement with the axis.

9. In a hand-gripped tool for lubricating a bearing having an inner and an outer relatively rotatable portion, said portions having an annular space therebetween concentric with their axis of rotation, the combination of a pair of relatively movable handles adapted to be gripped between the thumb and index finger of an operator's hand; a pair of relatively movable jaws between which said bearing is adapted to be interposed; a nozzle on one of said jaws and registrable with the annular space of an interposed bearing; a source of lubricant under pressure communicating with said nozzle; means responsive to the gripping action of the handles by the operator's hand for simultaneously transmitting clamping action to said jaws and the interposed bearing and for actuating said nozzle to admit lubricant from said source into said space, said nozzle including a bore; a piston mounted in said bore and movable to open and close said nozzle, spring means for normally urging said piston to closed position and yieldable in response to transmitted pressure to permit the piston to assume an opened position, a second spring on the other of said jaws for resisting said transmitted pressure including pressures exceeding the pressure exerted by said first spring, and means for adjusting the tension of said second spring to thereby vary the resistance offered to said transmitted pressure.

10. In an apparatus for lubricating a bearing provided with an outer member having an inner member mounted for relative rotation therein, the space between said members having entrances respectively at opposite exterior surfaces of the bearing, the combination of a pair of relatively movable jaws between which said bearing is adapted to be interposed, means for transmitting pressure to said jaws and interposed bearing, a lubricant dispensing nozzle mounted on one of said jaws and adapted to register with one of said space entrances, spring-actuated means for normally holding said nozzle in closed position and operable in response to said transmitted pressure to open the nozzle and to permit the discharge of lubricant into the adjacent space entrance, and a second spring-actuated means on the other of said jaws for resisting said transmitted pressure including pressures exceeding those required to open said nozzle.

References Cited in the file of this patent

UNITED STATES PATENTS

| | | |
|---|---|---|
| 1,698,157 | Dorsey | Jan. 8, 1929 |
| 2,396,124 | Pitisci | Mar. 5, 1946 |
| 2,656,012 | Thorpe | Oct. 20, 1953 |
| 2,716,912 | Maitland | Sept. 6, 1955 |
| 2,873,817 | Gerber | Feb. 17, 1959 |
| 2,875,794 | Schmertz | Mar. 3, 1959 |
| 2,937,677 | McIlwain | May 24, 1960 |